United States Patent [19]
Kureha

[11] 4,318,032
[45] Mar. 2, 1982

[54] CONVERGENCE CIRCUIT INCLUDING A QUADRANT SEPARATOR

[75] Inventor: Takeshi Kureha, Kadoma, Japan

[73] Assignee: Matsushita Electric Industrial Company, Limited, Osaka, Japan

[21] Appl. No.: 77,112

[22] Filed: Sep. 19, 1979

[30] Foreign Application Priority Data

Sep. 25, 1978 [JP] Japan ................................ 53-118345
Feb. 16, 1979 [JP] Japan ............................ 54-19104[U]

[51] Int. Cl.³ ........................ H01J 29/70; H01J 29/76
[52] U.S. Cl. .................................. 315/368; 315/13 C; 358/60
[58] Field of Search ................ 315/368, 13 C; 358/60

[56] References Cited

U.S. PATENT DOCUMENTS

3,943,279  3/1976  Austefjord ......................... 315/368
4,095,137  6/1978  Oswald ............................. 315/368

Primary Examiner—Theodore M. Blum
Attorney, Agent, or Firm—Lowe, King, Price & Becker

[57] ABSTRACT

A convergence circuit for use in a color television image display system comprising a modulator receiving at one input a first signal at the line frequency of the deflection circuit and at another input a second signal at the field frequency of the deflection circuit, a quadrant separator for separating the modulated signal into four sections in accordance with the polarity of the modulated signal and the respective first and second half periods of the field scan to generate four control currents corresponding respectively to the corners of a rectangular raster. The control currents are supplied through respectively adjustment potentiometers to a convergence coil to permit independent convergence of scanned points in the corners of the screen.

11 Claims, 25 Drawing Figures

| FIG. 2A | FIG. 2B |

CONVERGENCE CIRCUIT INCLUDING A QUADRANT SEPARATOR

BACKGROUND OF THE INVENTION

The present invention relates to color television image display systems and particularly to dynamic convergence circuits for the color television image display system which permits convergence of all scanned points in the four corner areas of a raster independently from one another.

An illustrative example of a color television display system is a projection type color image display system wherein three primary color images are superimposed on a viewing screen projected from respective kinescopes of different colors, or a multiple beam color kinescope of the type having a shadow mask or aperture grille. In the projection type color display system, the horizontal and vertical deflection waveforms for each kinescope tend to have different amplitudes and linearities from those of another kinescope and the horizontal and vertical axes of each raster tend to tilt at different angles resulting in a trapezoidal, or raster distortion differing from another. The three kinescopes are located with respect to a viewing screen so that the images on the kinescope screens are projected upwardly to allow the image formed on the viewing screen to find paths to the viewers' eyes. Therefore, the raster distortion tends to increase linearly as a function of the angular deflection of the beam from the lower to upper edges of the viewing screen. This is the misconvergence of projection type color display systems and conventional methods for eliminating such misconvergence involve modulating the horizontal sawtooth wave signal with the vertical sawtooth wave signal and applying the modulated signal to a convergence coil. However, due to errors arising from tolerances in manufacturing deflection coils and electron guns of each kinescope and tolerances in mounting each kinescope with respect to another, the adjustment involved is of a tedious, time-consuming affair to achieve convergence at all scanned points in the four corner areas of the raster.

In the multiple beam color kinescope having an aperture mask, on the other hand, the multiple beams are not converged at scanned points in areas off the center of the kinescope screen and the amount of misconvergence increases nonlinearly as a function of the angular deflection of the beams from the center of the kinescope screen. The usual practice is to generate current waveforms of a substantially parabolic shape from horizontal vertical deflection circuits and to employ them in conjunction with convergence control windings to dynamically converge the beams at all points of the scanned area of the kinescope screen, as disclosed in U.S. Pat. Nos. 3,393,343 and 3,500,113.

However, satisfactory results of convergences are difficult to achieve with respect to scanned points adjacent to the corner areas of the kinescope screen. This stems from the fact that the magnetic field intensity required to converge the beams at each corner area of the screen is not equal to the sum of the magnetic fields generated by the corresponding horizontal and vertical correction currents. U.S. Pat. No. 3,803,444 granted Apr. 9, 1974 to Gerritsen et al discloses a convergence circuit comprising substantially non-anisotropic astigmatic deflection coils to generate a quadripolar field which is superimposed on the normal deflection field to achieve convergence at all points in the corners of the screen. However, at least one additional specially designed deflection coil having coil halves is required to produce the intended result. This means that the use of deflection coils of the conventional design would not result in an acceptable level of convergence.

SUMMARY OF THE INVENTION

Accordingly, an object of the invention is to provide a convergence circuit for use in a color television image display system, which circuit includes means for separating a signal at the line frequency of the deflection system with a signal at the field frequency into four quadrant sections to generate four control signals corresponding to scanned points in the respective corners of the raster for converging the beam at the corners independently from one another. The control signals are supplied to the wiper of a respective one of four potentiometers having their end terminals connected in parallel to the input terminals of a differential amplifier to generate a control current to drive a convergence coil.

In the projection type color display system, the modulator receives waveforms of a generally sawtooth shape at the line and field frequencies to generate the modulated signal and in the multiple beam color kinescope, waveforms of a substantially parabolic shape at the line frequency are generated and modulated with a sawtooth waveform at the field frequency.

The means for separating the modulated signal includes a positive polarity detector and a negative detector for generating zero-clamped waveforms of positive and negative polarities which are selectively passed through a set of sampling gates during first and second half periods of the field or vertical scan to generate the four control signals. Convergence is effected for each corner of the screen by manual adjustment of the wiper tap point of the corresponding potentiometer.

Another object of the invention is therefore to provide a convergence circuit which permits the use of conventional deflection coils to achieve independent convergence at the corners of the screen.

BRIEF DESCRIPTION OF THE DRAWINGS

These and other objects, features and advantages of the invention will become apparent from the following detailed description of the invention with reference to the accompanying drawings, in which.

DETAILED DESCRIPTION

Figure 1:
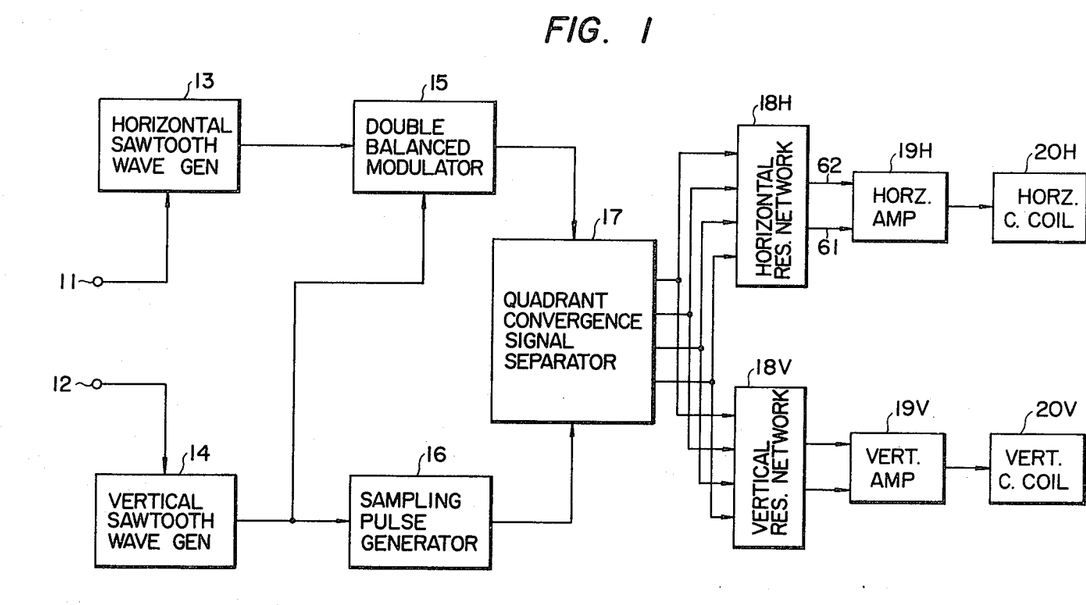
FIG. 1 is a schematic block diagram of a first embodiment of the invention.

The convergence control system of a first embodiment of the invention is shown in FIG. 1 as being employed in a projection type color television display system wherein each of three kinescopes is arranged to produce an image of a primary color on a projection screen in superposition with the images of other primary colors. The convergence control system comprises a horizontal sawtooth wave generator 13 and vertical sawtooth wave generator 14. The horizontal sawtooth generator 13 receives horizontal synchronization pulses derived in a known manner from the television receiver circuits (not shown) and generates waveforms of a substantially sawtooth shape which are fed to a one input of a double balanced modulator 15. The vertical sawtooth generator 14 receives vertical synchronization pulses derived in a known manner from the aforesaid television receiver circuits and supplies waveforms of a substantially sawtooth shape to another input of the modulator 15 and also to a sampling pulse generator 16. The double balanced modulator 15 provides modulation of the horizontal sawtooth waves with the vertical sawtooth waves and supplies it as one input to a quadrant convergence signal separator 17.

The sampling pulse generator 16 generates rectangular sampling pulses at a frequency twice the frequency of vertical scan. The quadrant convergence signal separator 17 is supplied with the sampling pulse to provide separation of the modulated signal into a set of four quadrant convergence control signals in a manner as will be described hereinbelow.

The separated signals from the separator 17 are fed on the one hand to a horizontal variable resistor network 18H and thence to a horizontal differential amplifier 19H whose output is coupled to a horizontal convergence coil 20H mounted around the neck portion of the associated kinescope and on the other hand to a vertical variable resistor network 18V and thence to a vertical differential amplifier 19V whose output is connected to a vertical convergence coil 20V mounted at right angles to the horizontal convergence coil 20H.

Although the FIG. 1 embodiment is shown as including a set of horizontal and vertical convergence coils 20H and 20V, the use of the two convergence coils is only a preferred form of the invention. It is also possible to achieve convergence in accordance with the invention with the employment of a single convergence coil for each associated kinescope.

Figures 2, 2A:
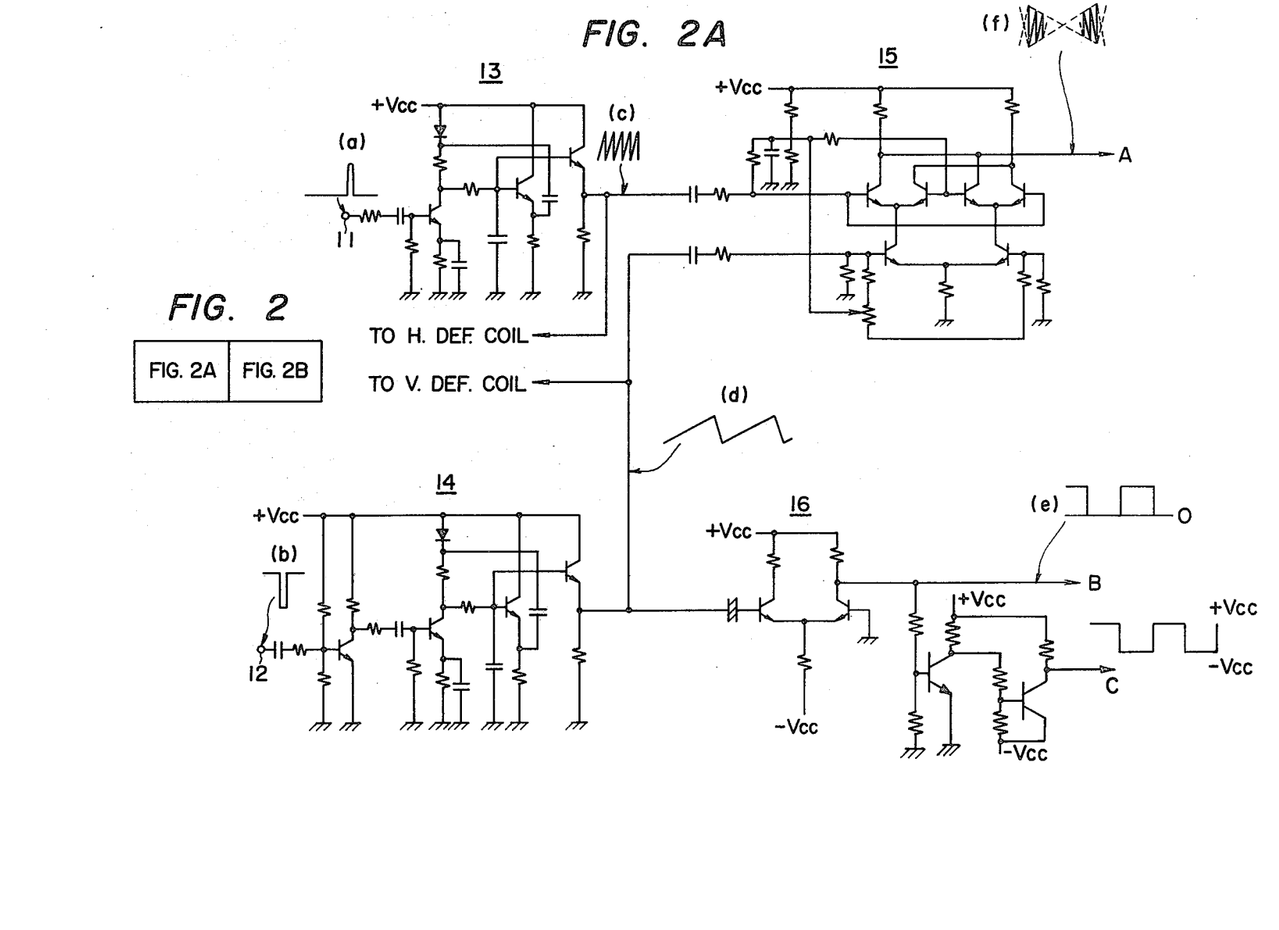
FIG. 2, shown in separate sheets A and B, is a detailed circuit diagram of the embodiment of FIG. 1.

Details of the circuit of FIG. 1 are illustrated in FIG. 2 on separate sections A and B. In FIG. 2A, the horizontal sawtooth wave generator 13 receives horizontal sync pulses (FIG. 3a) through an input terminal 11 and generates horizontal sawtooth wave signal (FIG. 3c) in a well known manner. The vertical sawtooth wave generator 14 receives vertical sync pulses (FIG. 3b) of negative polarity and generates a vertical sawtooth wave signal (FIG. 3d).

Figure 3:
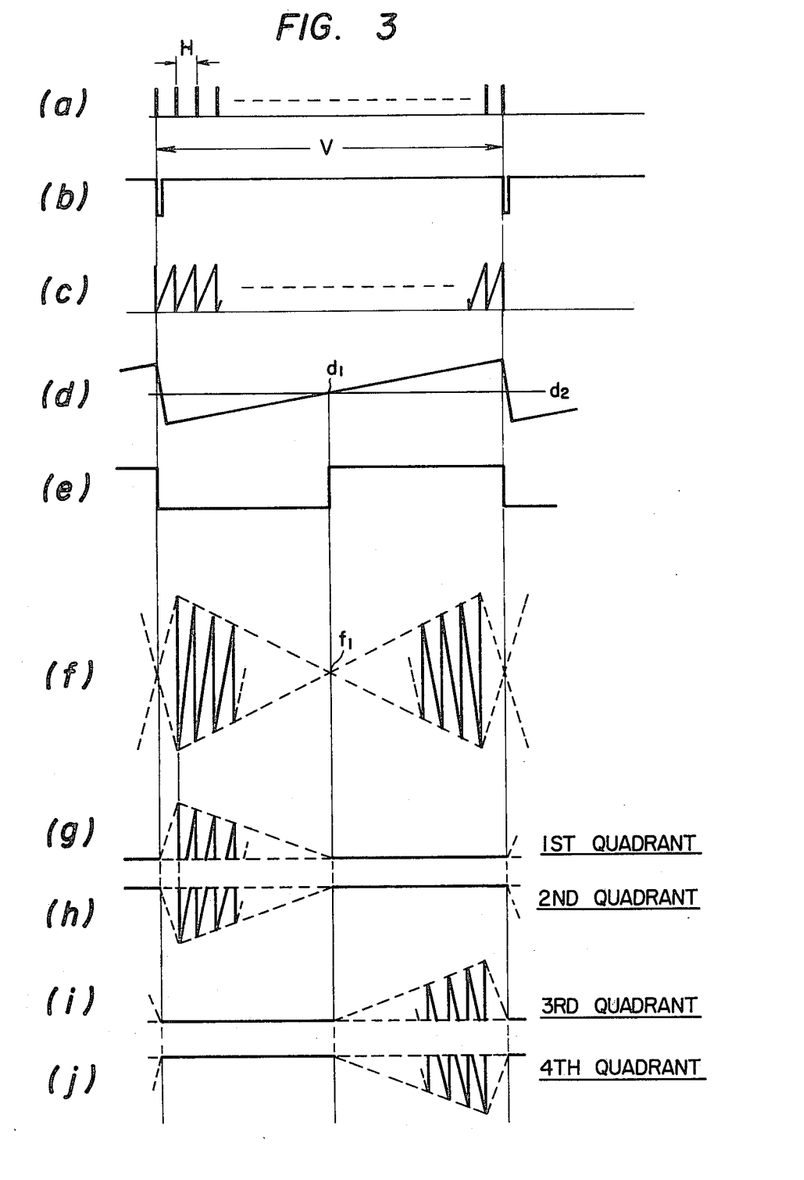
FIGS. 3a to 3j are waveform diagrams useful for describing the operation of the first embodiment.

The double balanced modulator 15 is also of a conventional design, which upon receipt of the two sawtooth wave signals provides a modulated signal of the waveform shown in FIG. 3f. This waveform is basically sawtooth pulses at the frequency of the horizontal line scan with the peak-to-peak amplitude varying linearly as a function of time and varying symmetrically with respect to a crosspoint f1 corresponding to a point d1 which lies at the intersection of the vertical sawtooth wave with its average DC level d2 (FIG. 3d).

For purposes of illustration the sampling pulse generator 16 comprises a current switch circuit 16a of paired transistors which generates square wave pulses (FIG. 3e) whose duration at the high or low voltage level is exactly one-half the vertical sync period V by sensing the average DC level d2 of the input vertical sawtooth wave. A current switch circuit 16b is further included to generate similar square wave pulses which are in phase with the pulses provided by the circuit 16a except that they have different amplitudes for purposes of individually driving gate circuits.

Figure 2B:
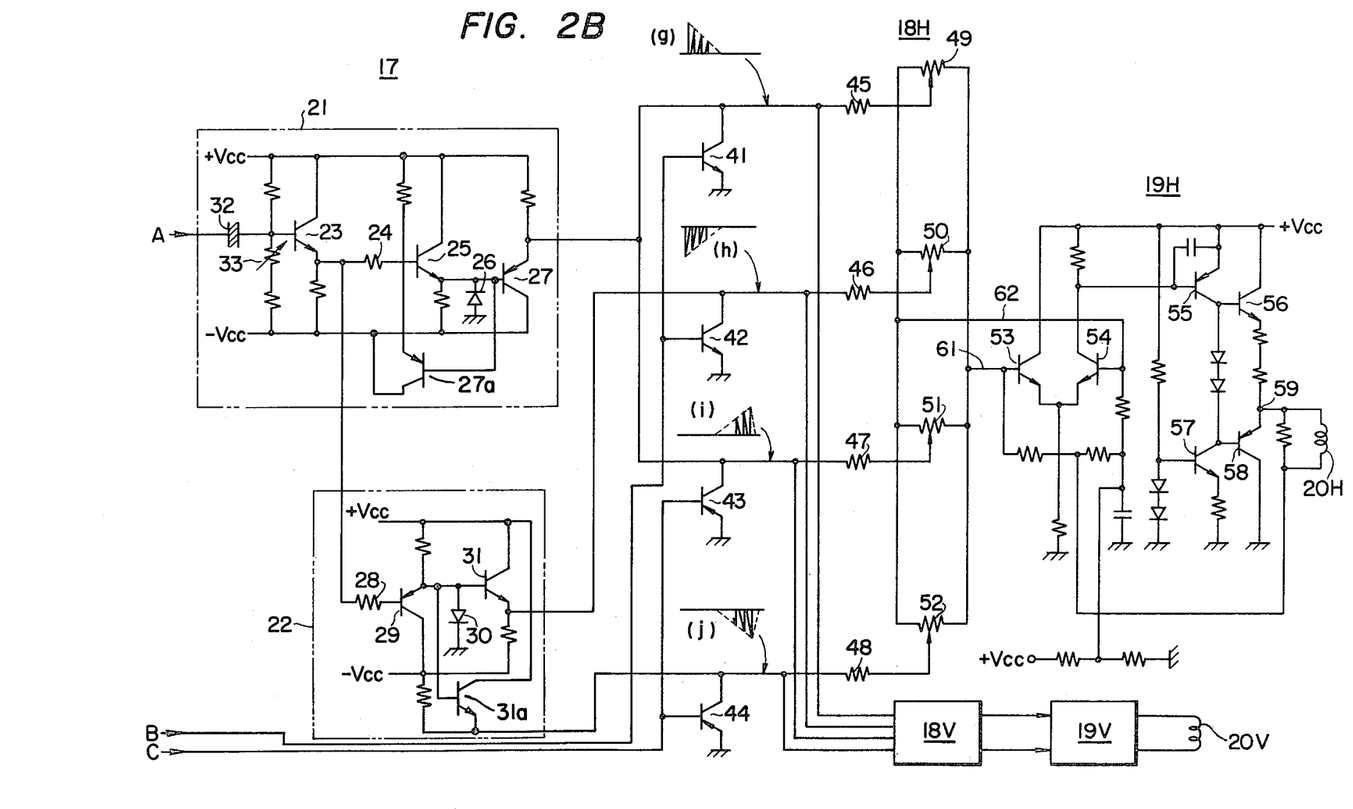

The quadrant convergence signal separator 17 comprises, as shown in FIG. 2B, a positive polarity detector 21, a negative polarity detector 22 and a plurality of sampling gates 41, 42, 43 and 44 of which the gates 41 and 42 are activated for an internal complementary to the gates 43 and 44. The positive polarity detector 21 includes an emitter-follower transistor 23 which receives the modulated sawtooth wave signal at its base electrode through a coupling capacitor 32. The base of the transistor 23 is biased by means of a voltage divider including a variable resistor 33 connected between positive and negative voltage source terminals +Vcc and −Vcc. The detector 21 further includes an n-p-n transistor 25 of the emitter-follower configuration whose base is connected to the emitter of transistor 23 by a coupling resistor 24 and whose emitter is connected to the base of a p-n-p transistor 27, the emitter of the latter being connected to the voltage source terminal +Vcc through a loading resistor. A clipping diode 26 is provided to clip the negative polarity peaks of the modulated signal to the zero voltage level so that there appear at the emitter of transistor 27 the positive peaks of the modulated signal. A transistor 27a, which is similar in function to transistor 27, is further included having its emitter-collector path connected in parallel with the transistor 27 and its base connected to the base of the transistor 27.

The negative polarity detector 22 is similarly constructed to the positive polarity detector 21 with the exception that the detector 22 takes its input from the emitter of transistor 23 through a coupling resistor 28 and that the conductivity types of transistors 29 and 31, 31a and diode 30 are opposite to the conductivity types of the corresponding elements of the positive polarity detector 21. The variable resistor 33 is so adjusted that the average DC level of the modulated signal appearing at the emitters of the transistors 25 and 29 is zero.

The sampling gates 41 and 42 are each formed of n-p-n transistors which respectively provide the outputs of the positive and negative detectors with a short-circuit path to ground in response to the sampling pulse on line B when the latter is at a high voltage level during the second half period of the vertical scan. The sampling gates 43 and 44 are each formed of p-n-p transistors which respectively provide the outputs of the positive and negative detectors 21 and 22 with a short-circuit path to ground in response to the sampling pulse on line C when the latter is at low voltage level. Therefore, the sampling gates 41 and 42 are vertical first half period gates which allow the passage of signals from the associated input circuits when nonconductive during the first half period of the vertical scan and inhibit the passage of the signals during the second half period. The sampling gates 43 and 44 are vertical second half period gates which allow the passage of signals from the associated circuits during the second half period of the vertical scan and inhibit the passage of the signals during the first half period.

The output waveforms of the gates 41, 42, 43 and 44 are respectively shown in FIGS. 3g, 3h, 3i and 3j. As seen from these Figures, the signals from the gates 41 and 42 correspond to scanned points in the first and second quadrants, or upper right and upper left regions of the rectangular raster, respectively. Since the waveform of the second half period of the modulated signal is inverted with respect to the waveform of the first half period as is seen from FIG. 3f, the signals from the gates 43 and 44 respectively correspond to scanned points in the third and fourth quadrants, or lower left and lower right regions of the raster.

The output signals from the gates 41 to 44 are therefore the four quadrant convergence control signals which are respectively connected through coupling resistors 45, 46, 47 and 48 to the wiper tap points of variable resistors 49, 50, 51 and 52, respectively, of the horizontal adjustment resistor network 18H. The variable resistors 49 to 52 are connected in parallel between output terminals 61 and 62 which are in turn connected to the bases of transistors 53 and 54 of the horizontal differential amplifier 19H, respectively. The collector of transistor 54 is connected to a Darlington power amplifier stage including transistors 55 to 58 to drive the horizontal convergence coil 20H through a junction point 59 between the emitters of transistors 56 and 58. The bases of the paired transistors 53 and 54 are so biased that there is no current flow through the convergence coil 20H when the wiper tap points of all the variable resistors are adjusted to their midposition of the resistance elements.

The vertical adjustment network 18V and vertical differential amplifier stage 19V are of the identical construction to the horizontal network 18H and horizontal differential amplifier 19H, respectively, and receive the same convergence control signals from the quadrant separator 17 as those supplied to the horizontal circuits.

By moving the wiper tap of each variable resistor in a given direction from the center tap point, it is possible to deflect the beam in a given direction to an extent proportional to the deviation from the center tap and by moving the wiper tap in the opposite direction from the center tap the beam is deflected in the opposite direction. Therefore, the extent and direction of convergence adjustment are effected.

Because of the separation of the modulated signal into four quadrant signals, the present invention permits independent convergence control with respect to each quadrant regions of the raster by adjusting each variable resistor of the networks 18H and 18V.

The parallel connected configuration of the variable resistor network 18 also permits parallel connection thereto of a set of additional variable resistors whose wiper tap points are respectively connected to receive horizontal and vertical sawtooth wave signals and a signal of a substantially parabolic shape for purposes of overlapping these signals on the convergence signals supplied from the quadrant separator 17 to provide additional corrections to eliminate errors known as raster distortions.

Figure 4:
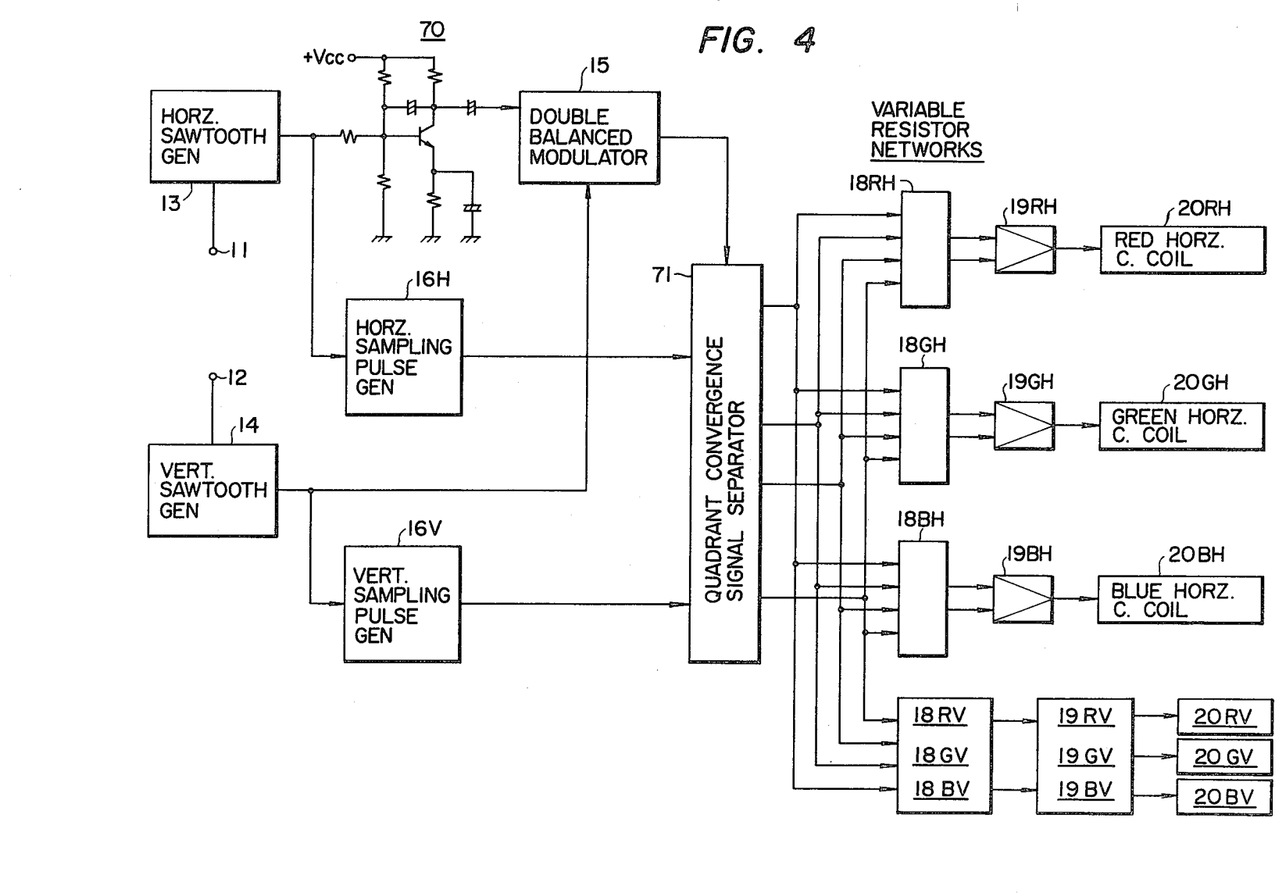
FIG. 4 is a schematic block diagram of a second embodiment of the invention.

A convergence control circuit shown in FIG. 4 is another embodiment of the invention which eliminates the misconvergence in the perimetrical areas of the screen of a multi-beam color television kinescope of the type having a shadow mask or aperture grille, and provides the independent convergence control with respect to the four quadrants of the screen as well. In FIG. 4 identical parts to those shown in FIG. 1 are numbered with similar numerals. The circuit of FIG. 4 is characterized by the inclusion of a parabolic wave generator 70, a horizontal sampling pulse generator 16H, and a quadrant convergence signal separator 71 which differs from the separator 17 of FIG. 1 in certain respects, and the inclusion of a set of red, green and blue variable resistor networks 18R, 18G, 18B and associated circuits to achieve horizontal and vertical convergence control.

Figure 6:
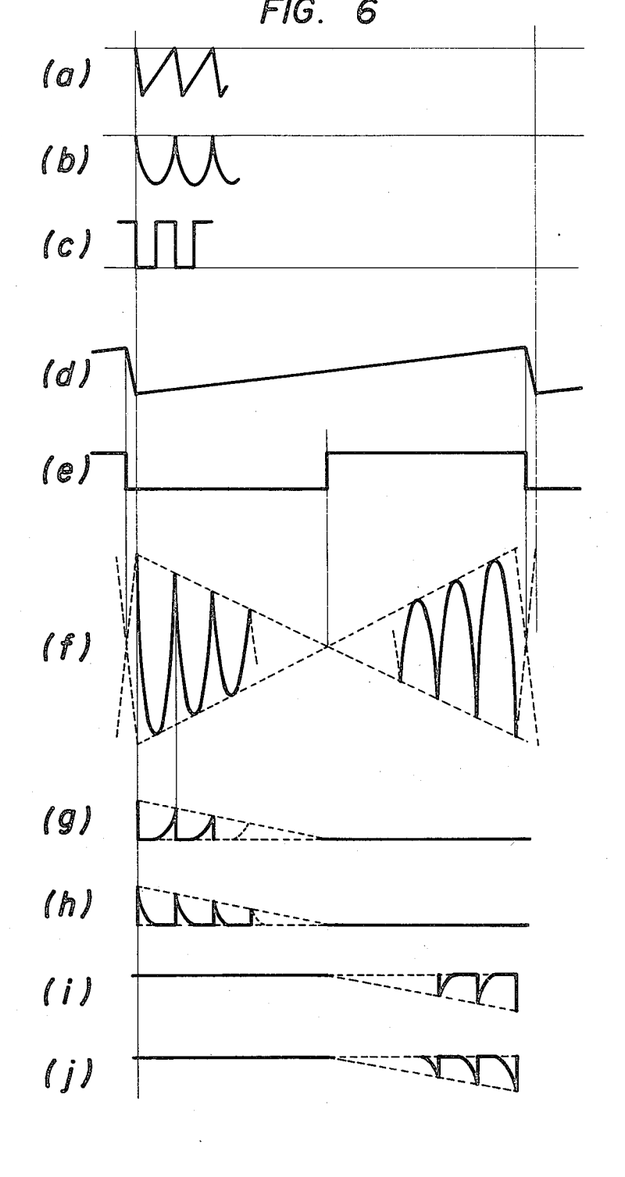
FIGS. 6a to 6j are waveform diagrams associated with the second embodiment of the invention.

The parabolic wave generator 70 essentially comprises a Miller integrator which receives an output signal (FIG. 6a) from the horizontal sawtooth generator 13 and generates a signal of a substantially parabolic shape (FIG. 6b) which is applied as an input to the double balanced modulator 15. The latter also receives another input signal (FIG. 6d) from the vertical sawtooth generator 14. The modulated signal from the output of modulator 15 is shown in FIG. 6f, which is basically parabolic pulses at the horizontal frequency with the peak-to-peak amplitude varying linearly as a function of time and varying symmetrically with respect to a point corresponding to the midpoint of the vertical sawtooth waveform of FIG. 6d.

The horizontal and vertical sampling pulse generators 16H and 16V are of the identical construction to the pulse generator 16 of FIG. 2A. The horizontal pulse generator 16H is designed to sense the average DC level of the horizontal sawtooth wave signal and generates sampling gate pulses with a duration one-half the horizontal scan period for each of the high and low voltage levels (FIG. 6c).

The quadrant separator 71 is supplied with the sampling pulses from both pulse generators 16H and 16V and with the modulated signal from the modulator 15 as in the previous embodiment. As will be described hereinbelow the quadrant separator 71 provides separation of the modulated signal in response to the horizontal and vertical sampling gate pulses into four quadrant convergence signals useful for achieving convergence at scanned points in the perimetrical areas and applies them to the red, green and blue variable resistor networks 18RH, 18GH and 18BH to achieve horizontal convergence, and also to the red, green and blue variable resistor networks 18RV, 18GV and 18GB to achieve vertical convergence. Each of the networks 18R, 18G and 18H is of the identical construction to the network 18 of FIG. 2B and supplies adjusted control current through a respective one of the differential amplifiers 19R, 19G and 19B to a respective one of the red, green and blue convergence coils 20R, 20G and 20B.

Figure 5:
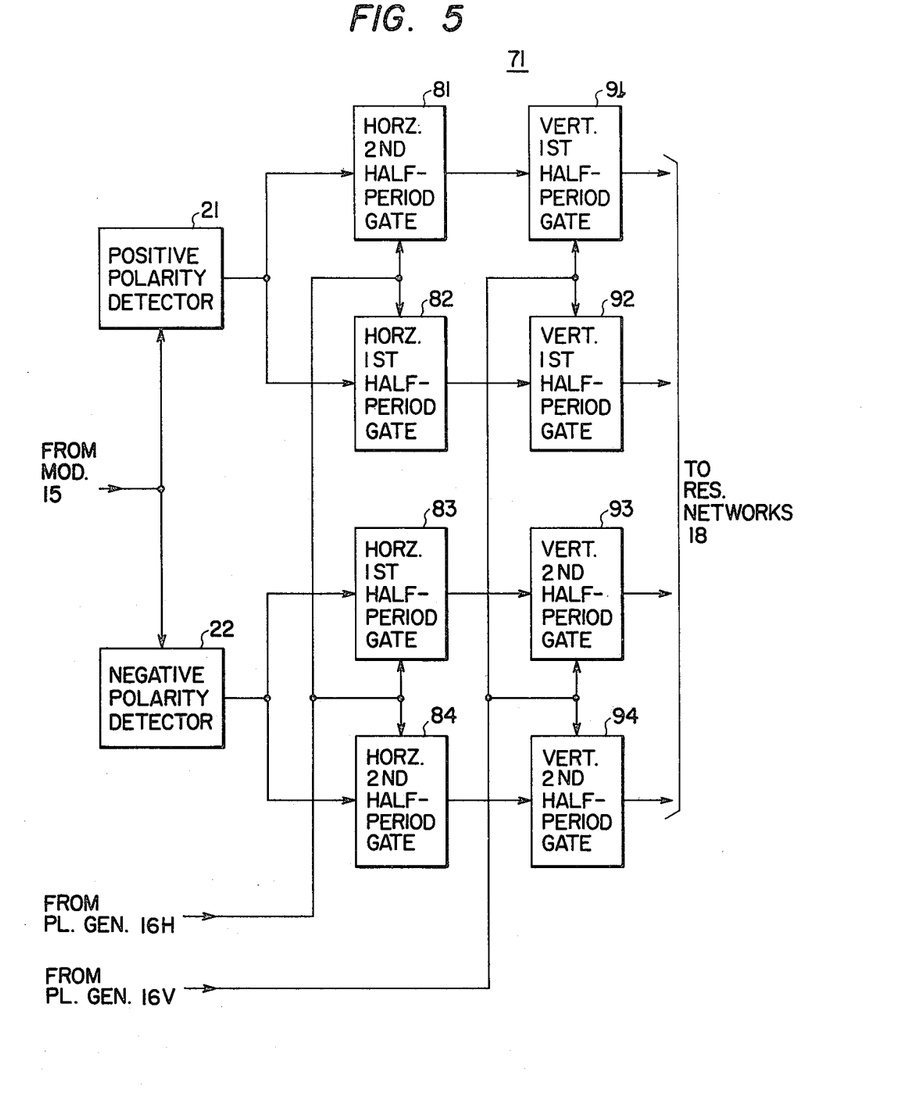
FIG. 5 is a block diagram showing the detail of a separating circuit of the second embodiment of the invention.

Referring to FIG. 5, the quadrant separator 71 is shown in detail in which the same numerals are used to indicate the elements having the same functions as those in FIG. 2B and the description thereof is omitted for the sake of succinctness. The negative polarity detector 22 may be constructed in the same configuration as the positive detector 21, and in this case the negative detector 22 takes its input from the modulator 15 as illustrated. The separator 71 includes a set of four horizontal sampling gates, or more specifically, horizontal second half period gates 81 and 84 and, horizontal first half period gates 82 and 83. The second and first half period gates 81 and 82 have their controlled inputs connected to the output of the positive detector 21, and the first and second half period gates 83 and 84 have their controlled inputs connected to the output of the negative detector 22, all of the gates 81 to 84 having their sampling control inputs connected to receive pulses from the horizontal sampling pulse generator 16H. The quadrant separator 71 further includes a set of four vertical sampling gates, or more specifically, vertical first half period gates 91 and 92 and vertical second half period gates 93 and 94. The gates 91 and 92 have their controlled inputs connected respectively to the controlled outputs of the horizontal gates 81 and 82, and the gates 93 and 94 have their controlled inputs connected respectively to the controlled outputs of the horizontal gates 83 and 84, the sampling control terminals of the vertical gates 91 to 94 being connected to receive vertical sampling pulses from the pulse generator 16V.

Since the nonlinearly rising and falling edges of the positive peaks of the modulated signal correspond respectively to scanned points in the perimetrical areas of the first and second quadrants of the raster and the nonlinearly rising and falling edges of the negative peaks correspond respectively to the perimetrical areas of the third and fourth quadrants, as seen from FIG. 6f, the signals appearing at the outputs of the vertical sampling gates 91, 92, 93 and 94 are convergence control signals used to effectively achieve convergence in the perimetrical areas of the first, second, third and fourth quadrants of the raster, respectively.

What is claimed is:

1. A convergence circuit for use in a television receiver having horizontal and vertical deflection systems for scanning a cathode ray beam to generate a rectangular raster on a cathode ray tube screen and at least one convergence coil for correcting the path of said beam, comprising:
   a first generator for generating a first signal of time-varying amplitude at a frequency synchronized with said horizontal deflection system;
   a second generator for generating a second signal of time-varying amplitude at a frequency synchronized with said vertical deflection system;
   a balanced modulator for modulating said first signal with said second signal to generate a modulated signal of a waveform symmetrical with respect to a point corresponding to the center of said raster;
   means for separating the waveform of said modulated signal into four components whose envelopes are symmetrical to said point so that the first signal contained in said separated components occurs in the respective quadrants of said raster in synchronism with the scanned cathode ray beam and the instantaneous amplitude of said components increases as a function of distance from the center of said raster to the corners thereof; and
   means for individually proportioning the amplitude of said separated components and applying the proportioned components to said convergence coil.

2. A convergence circuit as claimed in claim 1, wherein each of said first and second signals is substantially of a sawtooth waveform.

3. A convergence circuit as claimed in claim 1, wherein each of said first and second signals is substantially of a parabolic waveform.

4. A convergence crcuit as claimed in claim 1, 2 or 3, wherein said balanced modulator comprises a double balance modulator.

5. A convergence circuit as claimed in claim 1, wherein said separating means comprises:
   first means for separating said modulated signal into two successive components of the first and second half periods of the cycle of said first time-varying signal; and
   second means for separating said successively separated components respectively into successive portions of the first and second half periods of the cycle of said second time-varying signal to thereby generate said four components.

6. A convergence circuit as claimed in claim 5, wherein said first separating means comprises first and second polarity detectors for separating said modulated signal into said components according to the polarity of the modulated signal with respect to a reference level.

7. A convergence circuit as claimed in claim 3, wherein said separating means comprises:
   first and second polarity detectors for separating said modulated signal respectively into first and second polarity signals;
   first gate means for separating said first and second polarity signals respectively into two successive components of the first and second half periods of the cycle of said first time-varying signal; and
   second gate means for gating said four successive components during the first and second half periods of the cycle of said second time-varying signal.

8. A convergence circuit as claimed in claim 6 or 7, wherein said first polarity detector comprises:
   a first transistor of a given conductivity type having a base connected to receive said modulated signal from said balanced modulator; and
   a clipping diode connected to said first transistor for clamping an output signal of said transistor to zero voltage level;
   said second polarity detector comprising:
   a second transistor of an opposite conductivity type having a base connected to receive said modulated signal from said balanced modulator; and
   a clipping diode connected to said second transistor for clamping an output signal of said second transistor to zero voltage level.

9. A convergence circuit as claimed in claim 8, wherein each of said first and second transistors is in an emitter-follower configuration.

10. A convergence circuit as claimed in claim 1, 2 or 3, wherein said proportioning means comprises:
    a plurality of potentiometers connected in parallel between first and second terminals, the respective taps of said potentiometers being connected respectively to receive said four components; and
    a differential amplifier receptive of potentials developed at said first and second terminals to generate a control signal of different amplitude and polarity depending on the relative value of said potentials to one another for application to said convergence coil.

11. A convergence circuit as claimed in claim 10, wherein said proportioning means further comprises:
    a second plurality of potentiometers connected in parallel between first and second terminals, the respective taps of said second potentiometers being connected respectively to receive said four components, and
    a second differential amplifier receptive of potentials developed at said first and second terminals of said second plurality of potentiometers to generate a second control signal of different amplitude and polarity depending on the relative value of said potentials to one another for application to a second convergence coil.

* * * * *